United States Patent [19]

Elser

[11] Patent Number: 5,322,142
[45] Date of Patent: Jun. 21, 1994

[54] HYDRAULIC AUXILIARY POWER STEERING

[75] Inventor: Dieter Elser, Essingen, Fed. Rep. of Germany

[73] Assignee: ZF Friedrichshafen, AG., Friedrichshafen, Fed. Rep. of Germany

[21] Appl. No.: 971,755
[22] PCT Filed: Aug. 21, 1991
[86] PCT No.: PCT/EP91/01588
§ 371 Date: Feb. 9, 1993
§ 102(e) Date: Feb. 9, 1993
[87] PCT Pub. No.: WO92/03326
PCT Pub. Date: Mar. 5, 1992

[30] Foreign Application Priority Data

Aug. 24, 1990 [DE] Fed. Rep. of Germany ....... 4026746

[51] Int. Cl.$^5$ .......................... B62D 5/12; B62D 9/08
[52] U.S. Cl. .................................. 180/148; 180/132; 91/401; 92/13.5; 92/13.8
[58] Field of Search .................. 180/132, 147, 148; 91/401; 92/13.5, 13.8, 13

[56] References Cited

U.S. PATENT DOCUMENTS

| | | | |
|---|---|---|---|
| 4,159,723 | 7/1979 | Baatrup et al. | 180/132 X |
| 4,773,303 | 9/1988 | Stroud | 92/13 |
| 5,086,864 | 2/1992 | Elser | 180/132 X |

FOREIGN PATENT DOCUMENTS

| | | | |
|---|---|---|---|
| 1655927 | 7/1979 | Fed. Rep. of Germany | 180/132 |
| 2820567 | 11/1979 | Fed. Rep. of Germany | 180/132 |
| 8907064 | 8/1989 | PCT Int'l Appl. | 180/132 |

Primary Examiner—Margaret A. Focarino
Assistant Examiner—C. Mattix
Attorney, Agent, or Firm—Albert M. Zalkind

[57] ABSTRACT

This invention relates to a pressure turnoff device in the terminal positions of the steering deflection in an auxiliary power steering. In steering systems that reveal a working piston (2) that can be shifted in the steering housing, one inserts this turnoff device in a passage borehole (17) of working piston (2). For each steering direction, one provides a turnoff valve (20, 22 or 21, 23) which can be activated by a plunger (24 or 25) that bumps into a wall (30 and 31). To avoid any time consuming adjustment work on the turnoff valves (20, 22; 21, 23), the walls (30 and 31) contain screwed-in bolts (40 and 41) with pressed-on sleeves (32 and 33), with the sleeves working as stops. After installation of the auxiliary power steering in the vehicle, one can automatically press the sleeves (32 and 33) into the terminal position corresponding to the wheel steering angle. This is done in that, after preassembly of the sleeves (32 and 33), upon the bolt (40 and 41), and after screwing the combination thus created into housing (1), with the front axle jacked up, one first of all steers against the wheel stops without auxiliary power. In the process, one can press sleeves (32 and 33), by means of working piston (2), upon bolt (40 and 41) to the degree provided for the turnoff of the auxiliary power. Because the plungers (24 and 25) of the turnoff valves (20, 22; 21, 23) stick out of working piston (2) by dimension "x," the auxiliary power is turned off shortly before reaching the wheel deflections.

5 Claims, 1 Drawing Sheet

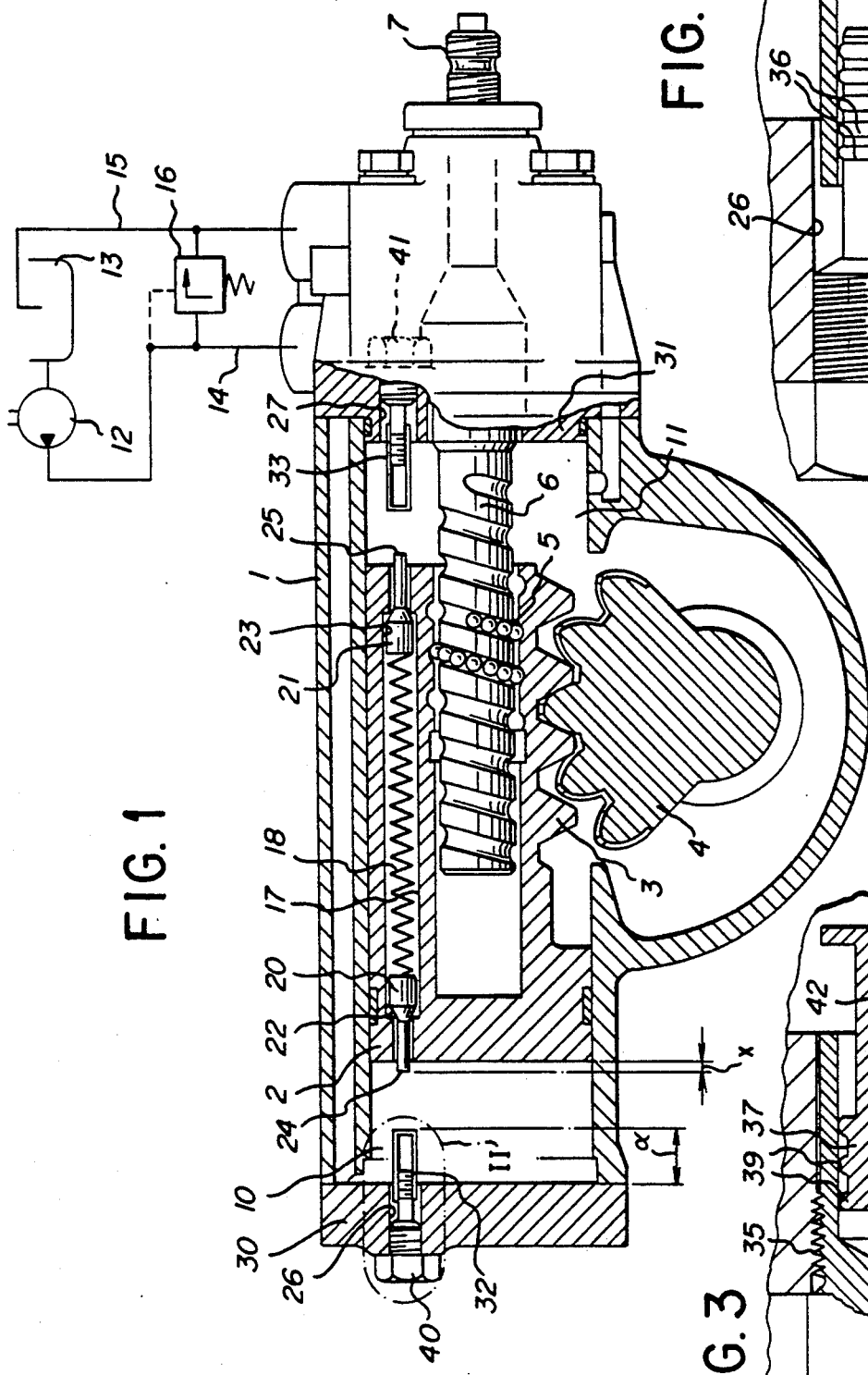
FIG. 1
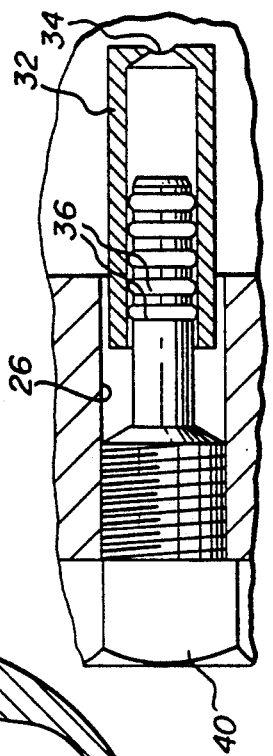
FIG. 2
FIG. 3

HYDRAULIC AUXILIARY POWER STEERING

This invention relates to a hydraulic auxiliary power steering, especially for motor vehicles, with a working piston that can be shifted in a housing on a threaded spindle and a steering valve that—as a function of the steering direction—directs pressure oil into one of the working chambers of the working piston. The working piston has an axial borehole in which—on both sides of the borehole outlet—sit turnoff valves whose plungers stick out of the working piston. To turn the auxiliary power off in the two steering deflection positions, the plungers run against stops inserted in radial walls of the housing. During the initial assembly, these stops can automatically, by means of the working piston, be pressed into the exact activation position in which the wheels reach the terminal stops.

Such a steering device is known from PCT publication WO 89/07064. There, the stops, made as sleeves, sit in boreholes of the radial housing walls, that is to say, the stops can be taken out only after the steering has been dismantled. Because the stops, following steering assembly, during the first steering action, are forced over the entire steering deflection to a press-in degree coordinated with the wheel stops, the steering can no longer be tested over the entire stroke range of the working cylinder without in the process altering the steering limitation setting. This means that the stops, which are movable for setting purposes must, after an examination, be pressed back into the starting position over the entire piston stroke by the pertinent housing drill holes, in other words, from the outside, so that they may subsequently once again be set by steering against the wheel stops. A new setting of the steering limitation can under certain circumstances also be required at the customer's end if the vehicle maker did the wrong setting.

The purpose of the invention is so to improve the steering limitation that even subsequent setting changes can be done without any major assembly effort.

According to a first embodiment of the present invention, the stops, made as sleeves, sit on bolts that can be screwed into the housing walls. The combination, consisting of bolt and sleeve, can easily be preassembled outside the housing. Here, the permitted shifting force can be monitored much more easily between a minimum value and a maximum value. According to the state of the art, monitoring the shifting forces in housing parts of different size is much more difficult.

Using the improved steering limitation, the threading holes in the housing and in the lid of the working cylinder can first of all be closed off with normal screws, so that the entire stroke range of the working piston can be examined. After the end of the testing procedure, one screws the bolts in with the movable sleeve, one tests the tightness of the arrangement, and one subsequently sets the predetermined turnoff points by coupling the working piston. If the vehicle customer should find that the steering limitation was set erroneously, then the combination, consisting of bolt and sleeve, can be easily exchanged from the outside, or the sleeve can be newly set on the bolt outside the steering. One can thus avoid having to dismantle the steering. The structural components, that can be stuck upon each other, have a lesser weight and can therefore be handled easily.

According to a further embodiment of the present invention, one can make the bolts also as sleeves that can be screwed in and one can press the stops in the form of small pistons into the sleeves. Using this variant, one can achieve the same setting and assembly advantages as with the model according to the first embodiment of the present invention set forth above.

If, according to a further aspect of the present invention, one provides the seat of the stops (sleeves or small pistons) with ring-shaped bulges, then one can thus achieve an improvement in the adhesion friction.

According to a further aspect of the present invention, the small pistons of the variant reveal relief boreholes so that the pressure will be the same on both piston sides. This means that no hydraulic adjusting forces can act on the pistons.

The description explains the two practical examples of the invention according to the drawing.

FIG. 1 is an auxiliary power steering in a profile with simplified illustration and FIG. 2 is an enlarged excerpt of Detail II in FIG. 1;

FIG. 3 is a model, illustrated in the form of an enlarged excerpt.

The auxiliary power steering consists of a steering housing 1 that is made as cylinder and in which a working piston 2 is shifted. Working piston 2 engages a steering worm sector shaft 4 by means of a toothing 3. Besides, working piston 2, which simultaneously serves as steering nut, engages steering worm gear 6 via a ball chain 5. On both sides of the working piston 2, there are pressure chambers 10 and 11. A high-pressure pump 12 feeds pressure oil from a tank 13 via a pressure line 14 to a steering valve (not shown) that cannot be steered [sic] by the rotary motion of the steering spindle. When the steering valve is in the neutral position, the pressure oil flows via a return line 15 to tank 13. A pressure limiting valve 16 sits between pressure line 14 and return line 15.

Working piston 2 contains a coaxial penetration borehole 17 with two turnoff pistons 20 and 21. A comparatively weak spring 18 forces turnoff pistons 20 and 21, in their basic position, against seats 22 and 23. Each of pistons 20 and 21 has a plunger 24 and 25.

According to the invention, one screws bolts 40 and 41 into boreholes 26 and 27 of walls 30 and 31 that run radially with respect to the steering spindle and sleeves 32 and 33 are pressed upon bolts 40 and 41 and act as stops. Plunger 24 and 25 sticks out of working piston 2 by a dimension of "x." The dimension "x" corresponds to a swing angle of the steering worm sector shaft amounting to about 2 degrees, that is to say, the working pressure is reduced during the bumping action, for example, of plunger 24 against sleeve 32, by about 2 degrees, prior to reaching the pertinent wheel stop. One can relieve the working pressure on sleeves 32 and 33 by means of small boreholes 34.

The adhesion between sleeves 32, 33 and bolts 40 and 41 in that one provides a seat (for example, on the bolts) with ring-shaped bulges 36. The radial surplus can be increased by means of these ring-shaped bulges with the press-in forces remaining the same. This means that the diameter tolerances can be greater with the same axial fastening security.

The turnoff device is set as follows:

After steering assembly, one first of all presses sleeves 32 and 33 only slightly upon bolts 40 and 41. Subsequently, the combination of bolt and sleeve is screwed into borehole 26 or 27. For setting purposes, one first of all steers against the wheel stops that limit the steering deflection, whereby working piston 2 pushes sleeves 32 and 33 further up upon bolts 40 or 41. Here, the press-in dimension "a" is set automatically. Because plungers 24 and 25 stick out of working piston 2 by the dimension of "x," the hydraulic force, during steering operation, will be turned off within this dimension "x" prior to reaching the wheel stops. This means that, for example, with working piston 2 moved to the left, the turnoff piston 20, which has been hit by plunger 24, will connect pressure chamber 11, which is under working pressure, via the turnoff piston 21, that opens already at low pressure and via passage borehole 17 with the relieved pressure chamber 10.

For bolts 40 and 41 that support sleeves 32 and 33, one provides—in the screw-in area of housing 1—the same threading as in the case of manually adjustable screws in the steering limitations, for example, according to DE-OS 29 30 498. As a result, one can avoid having to make new parts for the automatically adjustable steering limitation.

The variant according to FIG. 3 reveals screw-in sleeves 35 into which are inserted small pistons 37 as stops. Pistons 37 carry impact surfaces 38 against which, for example, plunger 24 (FIG. 1) comes to rest in the steering stop positions. Pistons 37 can—as described in conjunction with FIG. 2—be provided with ring-shaped bulges 39. Relief boreholes 42 are run through pistons 37.

Reference Symbols

1 Steering housing
2 Working piston
3 Toothing
4 Steering worm sector shaft
5 Ball chain
6 Steering worm gear
7 Steering spindle
8 —
9 —
10 Pressure chamber
11 Pressure chamber
12 High-pressure pump
13 Tank
14 Pressure line
15 Return line
16 Pressure limiting valve
17 Passage borehole
18 Spring
19 —
20 Turnoff piston
21 Turnoff piston
22 Seat
23 Seat
24 Plunger
25 Plunger
26 Borehole for 40
27 Borehole for 41
28 —
29 —
30 Wall
31 Wall
32 Sleeve
33 Sleeve
34 Small borehole
35 Screw-in sleeves
36 Ring-shaped bulges
37 Small pistons
38 Impact surfaces
39 Ring-shaped bulges
40 Bolts
41 Bolts
42 Relief boreholes

I claim:

1. Hydraulic auxiliary power steering, especially for motor vehicles, comprising:
   a housing (1) having walls;
   a working piston (2), positioned in said housing, that can be shifted on a steering worm gear (6);
   a steering valve which directs pressure oil into working chambers (10 and 11) of said working piston (2);
   in an axial borehole (17) of said working piston (2), sitting on both sides are turnoff valves (20, 22, 24; 21, 23, 25), with plungers (24, 25) sticking out of said working piston (2), to turn the auxiliary power off in the two steering deflection positions; and
   said turnoff valves (20, 22, 24; 21, 23, 25) are activated as the plunger bumps into stops that can be inserted in said housing walls;
   wherein during initial assembly, said stops can be pressed, by said working piston (2), automatically into the position determining the turnoff of the auxiliary power, and
   wherein said stops include sleeves (32, 33) that sit on bolts (40 and 41) that can be screwed into said housing walls (30 and 31).

2. Hydraulic auxiliary power steering according to claim 1 wherein the seat of said stops (sleeves 32, 33) includes ring-shaped bulges (36) to improve the adhesion friction between said sleeves and said bolts.

3. Hydraulic auxiliary power steering, especially for motor vehicles, comprising:
   a housing (1) having housing walls;
   a working piston (2), positioned in said housing, that can be shifted on a steering worm gear (6);
   a steering valve that directs pressure oil into working chambers (1) and 11) of said working piston (2);
   in an axial borehole (17) of said working piston (2), sitting on both sides, are turnoff valves (20, 22, 24; 21, 23, 25) with plungers (24, 25), sticking out of said working piston (2), to turn off the auxiliary power in the two steering deflection positions; and
   turnoff valves (20, 22, 24; 21, 23, 25) are activated as the plungers bump into stops that can be inserted in said housing walls;
   wherein during initial assembly, said stops can be pressed by said working piston (2), automatically, into the position determining the turnoff of the auxiliary power, and
   wherein said stops include small pistons (37) with impact surfaces (38) and said small pistons sit in screw-in sleeves (35).

4. Hydraulic auxiliary power steering according to claim 3 wherein said small pistons (37) include relief boreholes (42).

5. Hydraulic auxiliary power steering according to claim 3 wherein the seat of said stops (small piston 37) includes ring-shaped bulges (39) to improve the adhesion friction between said small pistons and said screw-in sleeves.

* * * * *